UNITED STATES PATENT OFFICE.

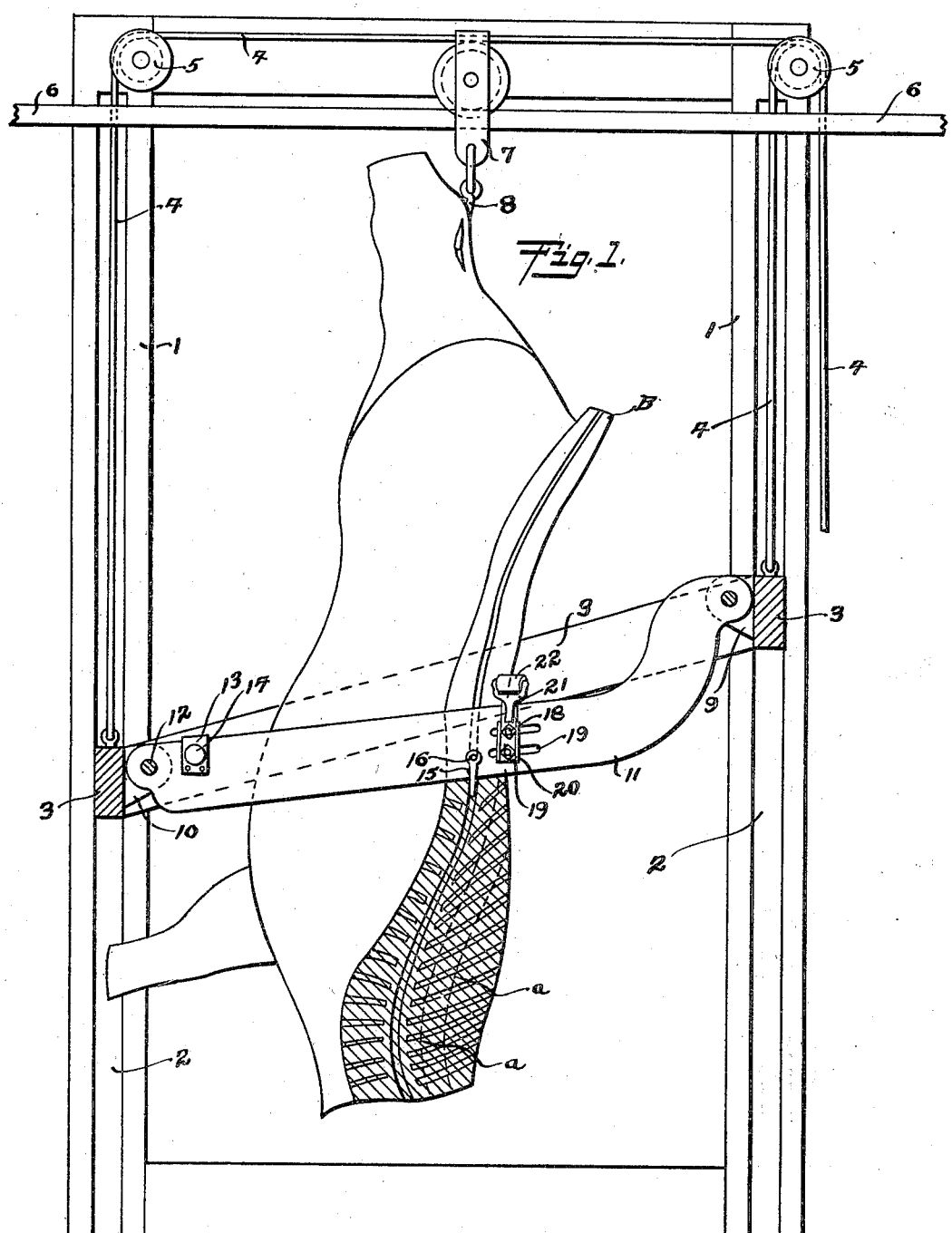

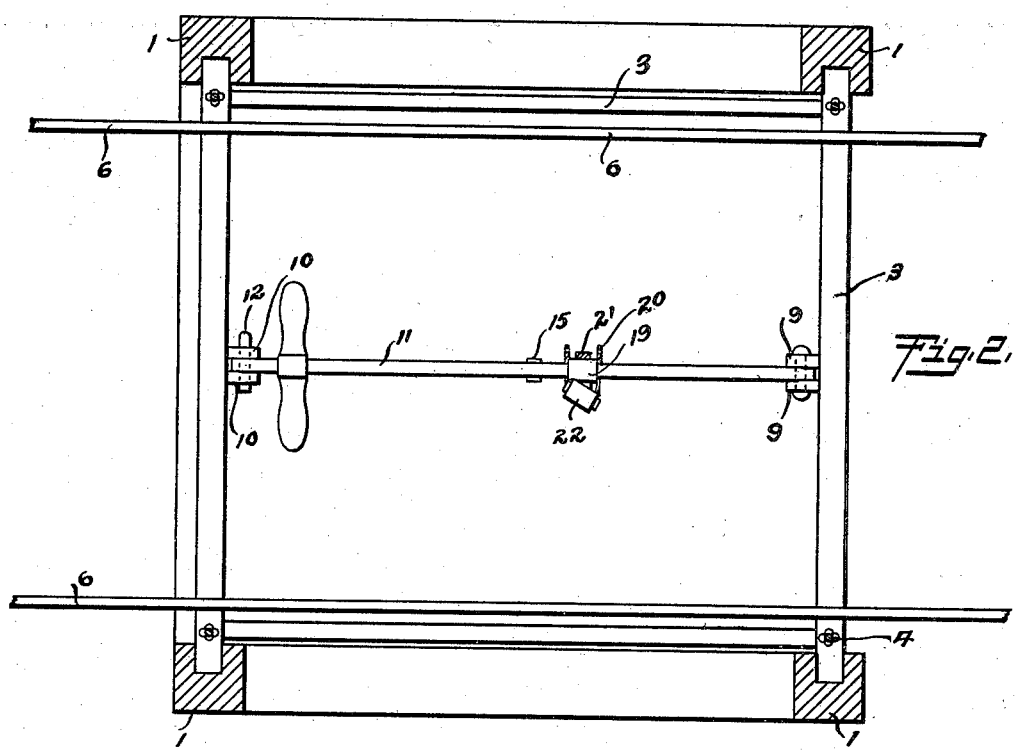
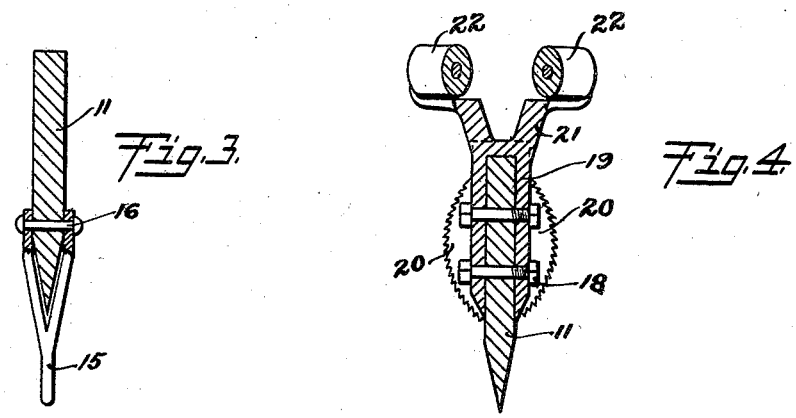

JOHN C. HUGHES, OF SOUTH OMAHA, NEBRASKA.

HOG OR CATTLE SPLITTING MACHINE.

SPECIFICATION forming part of Letters Patent No. 701,345, dated June 3, 1902.

Application filed February 7, 1902. Serial No. 93,078. (No model.)

*To all whom it may concern:*

Be it known that I, JOHN C. HUGHES, a citizen of the United States, residing at South Omaha, in the county of Douglas and State of Nebraska, have invented certain new and useful Improvements in Hog or Cattle Splitting Machines; and I do hereby declare the following to be a full, clear, and exact description of the invention, such as will enable others skilled in the art to which it appertains to make and use the same.

My invention relates to machines for splitting or dividing bullocks, beeves, or other animals; and it is the object thereof to provide a simple adjustable mechanism whereby the bodies of animals may be split exactly through the spinal column without deviating to one side or the other of the spinal cord.

In dividing animals by hand it is seldom possible to make an accurate division of the spine, and as any deviation in the division causes a loss in the meat value of the animal it is obvious that a considerable saving will be effected by the use of an accurate mechanical apparatus for the purpose.

My invention consists in a knife carried by a weighted frame and a spine-following point attached to the said knife.

It also consists in certain other novel combinations and arrangements of parts, as hereinafter set forth, and as shown in the accompanying drawings, in which—

Figure 1 is a side elevation, partly in section. Fig. 2 is a top plan view, also partly in section. Fig. 3 is a detail view of the knife, showing the spine-follower; and Fig. 4 is a detail view showing the saws and rollers for cutting and bending back the dorsal vertebræ.

While I have shown a mechanism constructed in accordance with my preferred form of apparatus, it will of course be understood that there can be changes in minor details of construction, the proportion, and the relative arrangement of parts without departing from the spirit of the invention or sacrificing any of the advantages thereof.

In the construction shown I employ a suitable framework, consisting, essentially, of the four upright posts 1 1 1 1, having in their contiguous sides slots or grooves 2 2 2 2 therein serving as guideways for a frame 3 of any approved form, but preferably constructed as herein shown.

Attached to the frame 3 at suitable points are cords or cables 4, which pass over pulleys 5 at the upper part of the posts 1 and enable the frame 3 to be raised or lowered, as desired.

Passing between the posts 1, near the tops of the same, are tracks 6 6, on which run carriers 7, having thereon hooks 8, from which the beeves are suspended by the large thigh-tendons in the usual manner, as shown in Fig. 1.

On the inner sides of the frame 3 are lugs 9 9 and 10 10, between one pair of which, for instance, as shown at 9 9, is pivotally secured one end of a knife 11, the opposite end of the knife being removably held between the lugs 10 10 by any suitable means—such, for instance, as the pin 12. While the knife used with my mechanism may be of any desired character, yet I have illustrated in the drawings, particularly in Fig. 1, the style and shape of knife which I have found to be most convenient and particularly well adapted for use in this respect. The knife-blade is curved upwardly at its pivotal end, as will be seen upon an examination of Fig. 1, and is so set or mounted with relation to the vertically-moving frame 3 as to be slightly inclined to the end removably mounted between the lugs 10 10. For convenience in handling the knife I secure to the back edge of the same, preferably near its lower removable end, a block 13, upon which is mounted handles 14, extending laterally from such block. Mounted on the lower portion of the knife, preferably about the center thereof, is a small downwardly-extending pin 15, provided at its upper end with a cleft or V-shaped portion, into which cleft the knife-edge is inserted, the pin being pivotally or movably secured to the knife through any suitable agency, such as the bolt 16, as shown in Fig. 3 of the drawings, and this V-shaped pin or device I have termed for the sake of convenience the "spine-follower," the function of which will be hereinafter more fully set forth. Near the spine-follower a V-shaped block is placed over the back of the knife and adjustably held in place by bolts 18, passing through slots 19 in the knife-blade. On the edges of the block 17 are secured small curved serrated saw-blades 20, as shown in Figs. 1, 2, and 4. Extending upwardly from the block 17 are the forked arms 21, each arm carrying an inclined roller, as at 22, as shown in Figs. 2 and 4, for a purpose hereinafter fully explained.

Having now explained the construction of my mechanism, the operation may briefly be described as follows: When it is desired to use the machine, the carriage or frame 3 is lowered to the bottom of the standards or posts 1, and the lower end of the knife is released and removed from between the lugs 10 10 by the withdrawal of the pin 12. The knife-blade is then swung upwardly on the pivoted point between the lugs 9 9 and the carcass of the animal to be split or cut is brought into position by means of the carrier, as illustrated in Fig. 1. The frame 3 is then raised to the top of the posts 1 and the knife is turned or brought into its normal or operative position and fastened between the lugs 10 10, as hereinbefore described. In turning the knife downward the curved portion of the blade strips and divides the tail-stump and rump of the animal. The handles 14 may be used at this time for pulling the knife downward. The tail-stump being split for a little way, the cavity in the spinal column occupied by the spinal cord is exposed, and the point of the spine-follower 15 is introduced into said cavity. The frame 3 (which is weighted or made heavy enough for the purpose) is then released, and the knife being guided by the spine-follower divides the animal exactly through the center of the spinal column. As the knife passes downwardly the serrated portions or saws 20 engage with and partly divide the long dorsal vertebræ over the shoulders of the animal along the lines a a. (Indicated in Fig. 1.) As the inclined rollers 22 press against the said vertebræ they bend back and partially break the same, this finishing the cut in the usual manner.

The many advantages of a mechanism for this purpose constructed as above described are so obvious that it is unnecessary to dwell upon them here.

Having thus fully described my invention, what I claim as new, and desire to secure by Letters Patent, is—

1. In a mechanism for dividing the carcasses of animals, the combination of standards or posts forming a main frame, such standards being grooved to permit of the reception and sliding therein of a quadrangular supplemental frame, means for bringing the carcass into proper position relative to the main frame, a knife pivoted at one end to the supplemental frame, and mechanism for retracting the supplemental knife-carrying frame to the top of the main frame when the cutting operation has been completed, substantially as set forth.

2. In a mechanism for dividing the carcasses of animals, the combination of a main frame, a supplemental frame movably mounted therein, the knife pivotally mounted on said frame, at one end and removably secured to the frame at the other end, and a handle mounted on said knife for assisting in operating such knife, substantially as set forth.

3. In a mechanism for dividing the carcasses of animals, the combination of a main frame, a supplemental frame vertically movable in said main frame, means for bringing the carcass into proper position relative to said main frame, cutting mechanism mounted on the supplemental frame for dividing the carcass, and devices mounted on the cutting mechanism for guiding the same relative to the carcass, during the operation of said cutting mechanism, substantially as set forth.

4. In a mechanism for dividing the carcasses of animals, the combination of a main frame, a supplemental frame vertically movable in said main frame, means for bringing the carcass into proper position relative to said frame, cutting mechanism mounted on the supplemental frame for dividing the carcass, devices mounted in the cutting mechanism for guiding the same during the operation thereof, and supplemental cutting and breaking means mounted on the cutting mechanism for assisting in the operation of dividing the carcass, substantially as set forth.

5. A mechanism for dividing the carcasses of animals, comprising in its construction a main frame, a supplemental frame slidably mounted in said main frame, a knife pivotally secured at one end in said supplemental frame, means for removably mounting the free end of the knife in the supplemental frame, and means on said knife for guiding it during the operation of dividing the carcass, substantially as set forth.

6. A mechanism for dividing the carcasses of animals, comprising in its construction a main frame, a supplemental frame, means for permitting the supplemental frame to move vertically in said main frame, a knife mounted on said supplemental frame, and means on said knife for guiding the same, relative to the carcass of the animal, such means comprising a pin movably secured to the cutting edge of the knife, substantially as set forth.

7. A mechanism for dividing the carcasses of animals, comprising in its construction a main frame, a supplemental frame, means for permitting the supplemental frame to move vertically in said main frame, a knife mounted on said supplemental frame, and supplemental devices on said knife for assisting in dividing the carcass, such devices comprising a block adjustably mounted on the knife-blade, serrated blades mounted on said block, relatively small arms extending upwardly from said block, and rollers mounted on said arms, the entire mechanism being adapted to bear against the carcass, when the knife is moving downward and splitting the same, substantially as set forth.

8. In a mechanism for dividing the carcasses of animals, the combination of a main frame, means for bringing the carcass in proper position relative to such frame, a supplemental frame sliding in said main frame, and a knife pivotally mounted at one end in said supplemental frame and removably secured at its other end to said supplemental frame, substantially as set forth.

9. In a mechanism of the class described, the combination with suitable supporting means, and carcass-dividing means, of means carried by said dividing means for following the cavity occupied by the spinal cord of a carcass for directing said dividing means in its movement, substantially as described.

10. In a mechanism of the class described, the combination with suitable supporting means and a carcass-dividing knife carried thereby, of a pin carried by said knife and extending from the cutting edge thereof for following the cavity occupied by the spinal cord of a carcass for guiding said knife, substantially as described.

11. In a mechanism of the class described, the combination with a suitable support and a carcass-dividing knife carried thereby, of a pin pivoted to said knife and extending forwardly therefrom for following the cavity occupied by the spinal cord of a carcass for guiding said knife, substantially as described.

In testimony whereof I hereunto affix my signature in presence of two witnesses.

JOHN C. HUGHES.

Witnesses:
  E. L. CHAMBERS,
  D. L. SHANAHAN.